United States Patent [19]

Tatematsu et al.

[11] Patent Number: 4,666,208
[45] Date of Patent: May 19, 1987

[54] WALK-IN MECHANISM ASSOCIATED WITH SEAT TRACK STRUCTURE

[75] Inventors: Kazuhisa Tatematsu; Tokuji Kondo; Shiro Sasaki; Koji Kawamatsu, all of Toyota, Japan

[73] Assignees: Arakawa Shatai Kogyo Kabushiki Kaisha; Toyota Jidosha Kabushiki Kaisha, both of Toyota, Japan

[21] Appl. No.: 905,444

[22] Filed: Sep. 10, 1986

[30] Foreign Application Priority Data

Sep. 11, 1985 [JP] Japan .............................. 60-139146[U]
Oct. 23, 1985 [JP] Japan .............................. 60-162320[U]

[51] Int. Cl.$^4$ .................................................. B60N 1/04
[52] U.S. Cl. ..................................................... 297/341
[58] Field of Search ............... 297/341, 340, 344, 379; 248/429, 430

[56] References Cited

U.S. PATENT DOCUMENTS 4,159,147 6/1979 Kiyomitsu et al. ................. 297/341
4,449,752 5/1984 Yasumatsu et al. ................. 297/341

FOREIGN PATENT DOCUMENTS 0013220 2/1977 Japan .................................... 297/341

Primary Examiner—Kenneth J. Dorner
Assistant Examiner—Mark W. Binder
Attorney, Agent, or Firm—Berman, Aisenberg & Platt

[57] ABSTRACT

In combination with a seat track structure including a movable track slidable on a stationary track, a handle shaft rotatably supported on the movable track, a lock plate secured to the stationary track, and a detent lever secured to the hand shaft and being loaded to engage the lock plate at a selected position, a walk-in mechanism includes a release lever rotatable on the handle shaft and being provided with an upward projection and a lateral projection, and a resilient plate having one end secured on the movable track, an intermediate portion provided with a downward projection and a flexible end portion formed with an opening to receive the upward projection of the release lever. The release lever is loaded toward a first position in which the projections of the release lever are respectively disengaged from the resilient plate and the detent lever and is connected to the back rest of a front seat in such a manner that when the back rest is tilted forwardly, the release lever is rotated to a second position in which the projections of the release lever are respectively engaged with the opening of the resilient plate and the detent lever to disengage the detent lever from the lock plate and maintian it in a disengaged position.

3 Claims, 6 Drawing Figures

WALK-IN MECHANISM ASSOCIATED WITH SEAT TRACK STRUCTURE

BACKGROUND OF THE INVENTION

1. Field of the Invention

The present invention relates to a seat track structure for adjusting a vehicle seat in a fore-and-aft direction and locking the seat in a selected position, and more particularly to a walk-in mechanism associated with a seat track structure for a front seat in a wheeled vehicle of the two door type.

2. Description of the Prior Art

A conventional seat track structure for a front seat in a wheeled vehicle of the two door type is associated with a walk-in mechanism for permitting forward movement of the front seat when a back rest of the seat is tilted forwardly and for permitting backward movement of the front seat when the back rest is raised backwardly to a selected reclining position. In general, the conventional seat track structure comprises an elongated lower stationary track secured on the floor of the vehicle compartment, an elongated upper movable track slidably mounted on the stationary track and secured to a seat cushion of the front seat, and a locking mechanism assembled with the movable track for locking the movable track on the stationary track in a selected position. The locking mechanism includes an elogated lock plate secured to the stationary track and being formed with a plurality of longitudinally equispaced locking holes, a crank handle having a shaft portion arranged along the seat track structure and rotatably supported on the movable track, a detent lever secured to the shaft portion of the handle for rotation therewith and arranged to be selectively engaged with the locking holes of the lock plate, and resilient means for biasing the detent lever toward the lock plate. In combination with the locking mechanism, the walk-in mechanism includes a release lever rotatably supported on the shaft portion of the handle for disengaging the detent lever from the lock plate by engagement therewith, and a linkage connecting the release lever to the back rest of the front seat in such a manner that the release lever is engaged with the detent lever when the back rest is tilted forwardly.

As is disclosed in Early Publication for Japanese Utility Model No. 55-127628, the seat track structure is further provided with a position memory mechanism which is arranged to lock the upper movable track in a predetermined position when it is moved backward. The position memory mechanism includes a memory plate in the form of an elongated resilient plate which is secured at one side thereof to the bottom surface of the lock plate to be flexible in a vertical direction at another side thereof. The memory plate extends forwardly from an intermediate portion of the lock plate and is arranged to receive the release lever thereon. When the release lever is rotated to disengage the detent lever from the lock plate, the memory plate is flexed downwards by engagement with the lower end of the release lever such that the release lever is slidably supported by engagement with the other side of the memory plate to maintain the detent lever in its disengaged position. Thus, the upper movable track can be moved forwardly or backwardly with the release lever in slidable engagement with the memory plate. When the release lever is disengaged from the rear end of the memory plate during backward movement of the movable track, the detent lever is returned to engage the lock plate thereby to lock the movable track on the stationary track in the predetermined position. In such an arrangement of the conventional position memory mechanism, a leg space for the passenger on the rear seat is narrowed due to presence of the memory plate, and slidable engagement of the release lever with the memory plate may not be maintained in a stable condition.

SUMMARY OF THE INVENTION

It is, therefore, a primary object of the present invention to provide an improved walk-in mechanism associated with the seat track structure which is capable of providing a sufficient leg space for the passenger on the rear seat and of retaining the release lever in a stable condition during forward and backward movements of the upper movable track.

According to the present invention, the primary object is attained by providing a walk-in mechanism associated with the seat track structure which comprises a release lever rotatably mounted on the shaft portion of the crank handle and being provided at an upper portion thereof with a first projection and at one side thereof with a second projection to be engaged with the detent lever, a resilient memory plate secured at one end thereof on the upper movable track and located above the release lever to be flexible in a vertical direction, the resilient plate being provided at an intermediate portion thereof with a downward projection and being formed at another end portion thereof with an opening to receive the first projection of the release lever therein, means for biasing the release lever toward a first position in which the first and second projections of the release lever are respectively disenaged from the resilient memory plate and the detent lever, and a cable linkage connecting the release lever to the back rest of the vehicle seat in such a manner that when the back rest is tilted forwardly, the release lever is rotated to a second position in which the first and second projections of the release lever are respectively engaged with the opening of the resilient memory plate and the detent lever and that when the back rest is raised rearwardly, the release lever is returned to the first position, wherein the lock plate is formed with an upwardly protruded rear end portion which is located to be brought into engagement with the downward projection of the resilient memory plate during backward movement of the movable track from a forwardly displaced position.

In such an arrangement of the walk-in mechanism, the resilient memory plate is arranged to move with the upper movable track when the vehicle seat is moved forwardly, and the release lever is maintained in engagement with the opening of the memory plate at its first projection during forward and backward movements of the seat. This is useful to provide a sufficient leg space for the passenger on the rear seat and to retain the release lever in a stable condition. In practice of the present invention, it is preferable that the upper movable track is formed at one side thereof with a recess which is arranged to receive the detent lever therein. This is effective to enhance strength in engagement of the detent lever with the lock plate.

BRIEF DESCRIPTION OF THE DRAWINGS

Additional objects, features and advantages of the present invention will become more readily apparent

DETAILED DESCRIPTION OF THE PREFERRED EMBODIMENT

Figure 1:
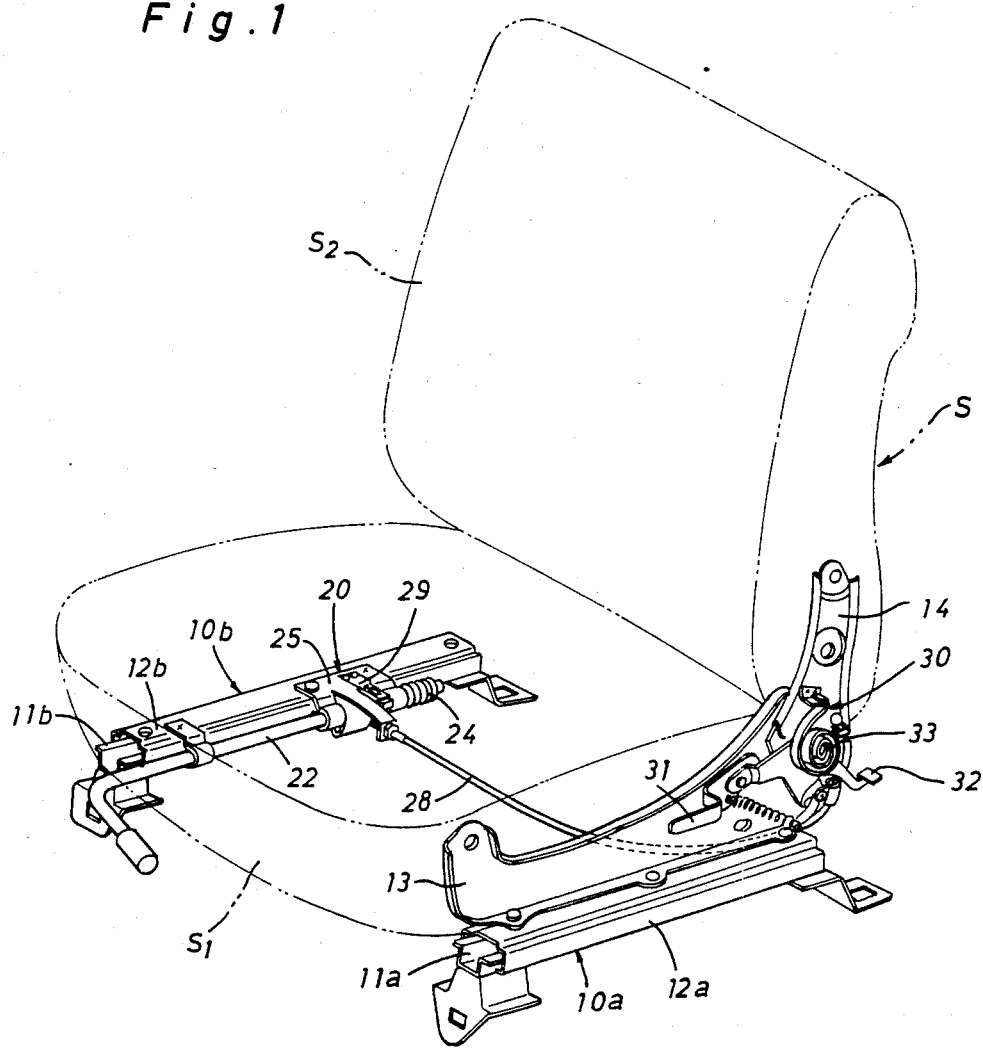
FIG. 1 illustrates a walk-in mechanism associated with a pair of seat track structures for supporting thereon a front seat in a wheeled vehicle of the two door type.

Referring now to the drawings, FIG. 1 illustrates a front seat S in a wheeled vehicle of the two-door type which is supported by a pair of seat track structures 10a and 10b. The left-hand seat track structure 10a includes an elongated lower stationary track 11a secured on the floor of the vehicle compartment and an elongated upper movable track 12a slidably supported on the stationary track 11a and secured longitudinally to the left side of the seat cushion $S_1$ of front seat S by means of an L-shaped upright lower bracket 13 fixed thereon. The right-hand seat track structure 10b includes an elongated lower stationary track 11b secured on the floor of the vehicle compartment and an elongated upper movable track 12b slidably supported on the stationary track 11b and secured longitudinally to the right side of seat cushion $S_1$ by means of an L-shaped upright lower bracket (not shown) fixed thereon.

The left-hand upright lower bracket 13 is rotatably connected at its rear end portion to an upper bracket 14 which is secured to the left side of the back rest $S_2$ of front seat S, while the right-hand upright lower bracket is rotatably connected at its rear end portion to an upper bracket (not shown) which is secured to the right side of back rest $S_2$. Assembled between the left-hand brackets 13 and 14 is a conventional reclining mechanism 30 which is arranged to lock the back rest $S_2$ in a selected reclining position. The reclining mechanism 30 includes a forwardly extending release lever 31 and a rearwardly extending release pedal 32 which are respectively arranged to release lock of the upper bracket 14 relative to the lower bracket 13. When the release lever 31 is pulled up or the release pedal 32 is depressed, the upper bracket 14 is released from its locked position so that the back rest $S_2$ is tilted forwardly under load of a spiral torsion spring 33. When the release lever 31 or pedal 32 is released at its operated position, the back rest $S_2$ can be raised backwardly and locked in a selected reclining position by means of engagement between the brackets 13 and 14.

Figure 2:
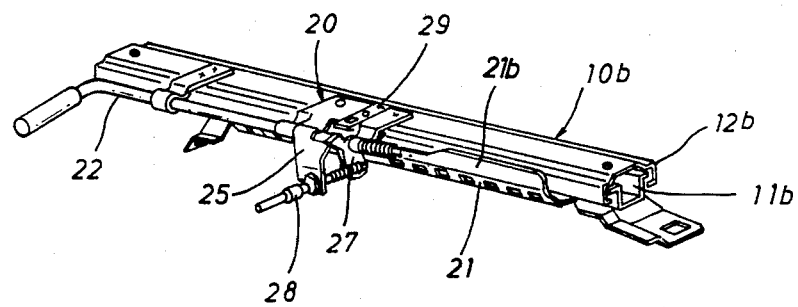
FIG. 2 is an enlarged perspective view of the right-hand seat track structure shown in FIG. 1.
Figure 3:
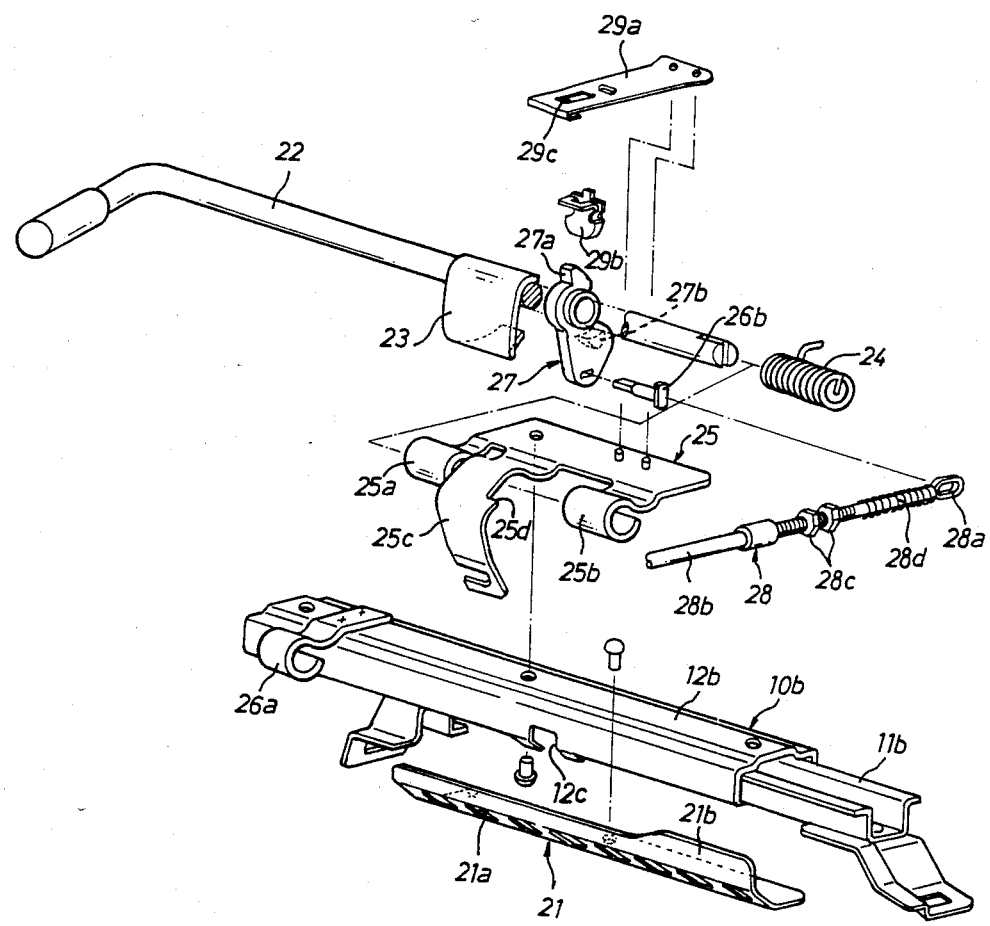
FIG. 3 is an exploded view illustrating component parts of the right-hand seat track structure and locking and walk-in mechanisms associated therewith.

As shown in FIGS. 2 and 3, a locking mechanism 20 is assembled with the right-hand seat track structure 10b to releasably lock the movable track 12b on the stationary track 11b in a selected position, which includes an elongated lock plate 21, a crank handle 22, a detent lever 23 and a coiled torsion spring 24. The lock plate 21 is arranged longitudinally along the inside of stationary track 11b and secured to the bottom surface of stationary track 11b. The lock plate 21 is formed with a plurality of longitudinally equi-spaced locking holes 21a. The crank handle 22 has a shaft portion arranged longitudinally along the movable track 12b and rotatably supported by a pair of spaced arms 25a, 25b of a mounting bracket 25 which is secured to the upper surface of an intermediate portion of movable track 12b. The shaft portion of crank handle 22 is further rotatably supported by a bracket 26a which is secured to the upper surface of a front end portion of movable track 12b. The detent lever 23 is secured to the shaft portion of handle 22 for rotation therewith and located under a central projection 25c of mounting bracket 25. The detent lever 23 has a lower end which is bent toward the lock plate 21 to be engaged with one of the locking holes 21a of lock plate 21. In this embodiment, the upper movable track 12b is formed at the inside thereof with a recess 12c which is arranged to receive the lower end of detent lever 23 therein. The torsion spring 24 is arranged in surrounding relationship with the rear end portion of handle 22 and is engaged at one end thereof with the rear end of handle 22 and at the other end thereof with the mounting bracket 25 to bias the detent lever 23 toward the lock plate 21.

Figure 4:
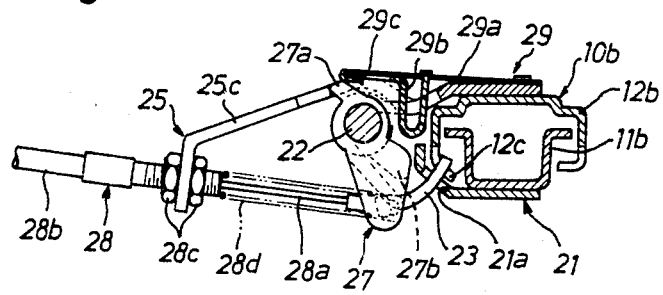
FIGS. 4 to 6 each are a sectional view illustrating operation of the locking and walk-in mechanisms shown in FIGS. 2 and 3.

A walk-in mechanism associated with the right-hand seat track structure 10b includes a release lever 27, a cable linkage 28 and a memory plate assembly 29. The release lever 27 is rotatably mounted on the shaft portion of handle 22 and located between the central projection 25c and arm 25b of mounting bracket 25. The release lever 27 is formed at its upper portion with a first projection 27a and at its one side with a second projection 27b which is arranged to be engaged with the detent lever 23. A lateral pin 26b is fixed to the lower end portion of release lever 27 and connected to a forward end of an inner wire 28a of cable linkage 28. The cable linkage 28 has an outer tube 28b which is supported by engagement with the central projection 25c of mounting bracket 25 and fastened in place by a pair of nuts 28c threaded thereon. Assembled between the inner wire 28a and the outer tube 28b is a compression coil spring 28d which acts to bias the release lever 27 in a counter-clockwise direction in FIG. 4. In a condition where the first projection 27a of release lever 27 is resiliently engaged with a stopper edge 25d of mounting bracket 25 under the load of compression coil spring 28d, the second projection 27b is spaced from the detent lever 23 in a predetermined distance. As shown in FIG. 1, the outer tube 28b of cable linkage 28 is fixedly connected at its rear end to the left-hand lower bracket 13, and the inner wire 28a of cable linkage 28 is connected at its rear end to the lower end of upper bracket 14 to cause clockwise rotation of the release lever 27 when the back rest $S_2$ is tilted forwardly. When rotated clockwisely, the release lever 27 is engaged at its second projection 27b with the detent lever 23 to cause clockwise rotation of the detent lever 23.

The memory plate assembly 29 includes a rectangular resilient memory plate 29a which is secured at its base end on the mounting bracket 25 and located above the release lever 27 to be flexible in a vertical direction. The resilient memory plate 29a is provided with a downwardly extending lug member 29b fixed to an intermediate portion thereof and formed with an opening 29c which is located to receive therein the first projection 27a of release lever 27. When the release lever 27 is rotated clockwisely, the resilient memory plate 29a is flexed upwards by engagement with the first projection 27a of release lever 27 for engagement therewith at its opening 29c. On the other hand, the lock plate 21 is formed with an upwardly protruded rear end portion 21b which is located to be brought into engagement with the lug member 29b. When the upper movable track 12b is moved backwardly from its forwardly displaced position, the lug member 29b on memory plate 29a is raised by engagement with the upwardly protruded rear end portion 21b of lock plate 21 to flex the memory plate 29a upwards so that the first projection 27a of release lever 27 is disengaged from the opening 29c of memory plate 29a.

Assuming that the detent lever 23 is in engagement with one of the locking holes 21a of lock plate 21, the upper movable track 12b is locked on the lower stationary track 11b to restrain fore-and-aft movement of the front seat S in a selected position as shown in FIG. 1. When the crank handle 22 is is rotated clockwisely against torsion spring 24, the detent lever 23 is rotated with the handle 22 clockwisely and is disengaged from the locking hole 21a of lock plate 21 to release the upper movable track 12b from the locked position thereby to permit adjustment of the front seat S in the fore-and-aft direction. When the crank handle 22 is released after adjustment of the front seat S to a desired position, the biasing force of torsion spring 24 acts to rotate the crank handle 22 counterclockwisely so as to effect engagement of detent lever 23 with another locking hole 21a of lock plate 21. Thus, the upper movable track 12b is locked on the stationary track 11b to lock the front seat S in the adjusted position.

Figure 5:
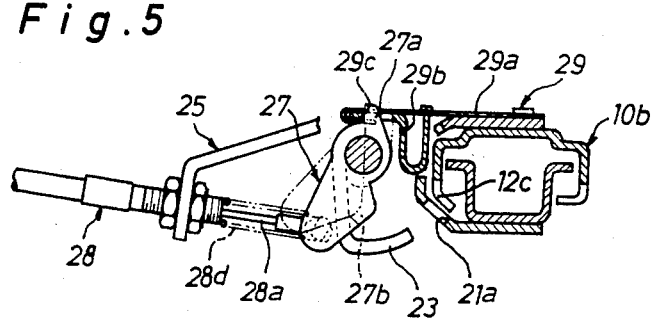

When the operation lever 31 or pedal 32 of reclining mechanism 30 is operated to tilt the back rest S2 of front seat S forwardly, the inner wire 28a of linkage cable 28 is pulled to rotate the release lever 27 clockwisely against the biasing force of compression coil spring 28d. Such clockwise rotation of the release lever 27 causes the first projection 27a of lever 27 to engage the resilient memory plate 29a and causes the second projection 27b of lever 27 to engage the detent lever 23. (see FIG. 4) Thus, the resilient memory plate 29a is flexed upwards by engagment with the first projection 27a of lever 27 and engages the first projection 27a of lever 27 at its opening 29c, while the detent lever 23 is rotated clockwisely by engagement with the second projection 27b of lever 27 to effect clockwise rotation of the crank handle 22 against the biasing force of torsion spring 24. (see FIG. 5) As a result, the detent lever 23 is disengaged from the locking hole 21a of lock plate 21 to release the upper movable track 12b from the locked position, and the release lever 27 is retained by engagement with the opening 29c of memory plate 29a to hold the detent lever 23 in a released position. This causes forward movement of the front seat S to a maximum forward stroke end under the biasing force of a tension spring (not shown) acting thereon to facilitate getting in and out of the rear seat.

Figure 6:
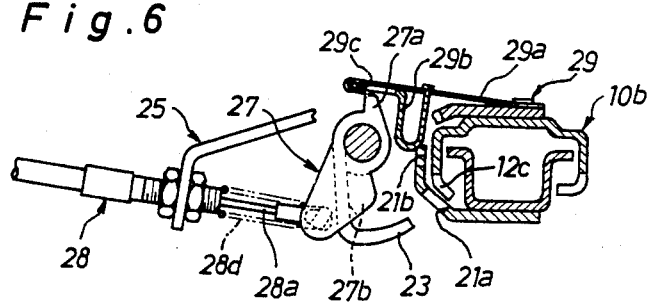

When the front seat S is moved backward after the back rest S2 of front seat S is raised toward a reclining position in a condition where the front seat S is in the maximum forward stroke end, the downwardly extending lug 29b of memory plate 29a is raised by engagement with the upwardly protruded rear end portion 21b of lock plate 21 during backward movement of the front seat S. (see FIG. 6) As a result, the memory plate 29a is flexed upwards and causes the first projection 27a of release lever 27 to disengage from the opening 29c of memory plate 29a. Then, the release lever 27 is rotated counterclockwisely under the biasing force of compression coil spring 28d, and in turn, the crank handle 22 and detent lever 23 are rotated counterclockwisely under the biasing force of torsion spring 24 to effect engagement of the detent lever 23 with the predetermined locking hole 21a of lock plate 21. Thus, the upper movable track 12b is locked on the stationary track 11 to restrain the front seat S in the predetermined position.

From the above description, it will be understood that in the walk-in mechanism the memory plate 29a is secured on the upper movable track 12d to move therewith when the front seat S is moved forwardly. This is useful to provide a sufficient leg space for the passenger on the rear seat. It will be also understood that in the walk-in mechanism, the release lever 27 is maintained in engagement with the opening 29c of memory plate 29a at its first projection 27a during forward and backward movements of the front seat S. This is useful to retain the release lever 27 in a stable condition during forward and backward movements of front seat S.

Although a specific embodiment of the present invention has been shown and described, it is obvious that many modifications and variations thereof are possible in light of these teachings. It is, therefore, to be understood that within the scope of the appended claims, the invention may be practiced otherwise than as specifically described herein.

What is claimed is:

1. A walk-in mechanism associated with a seat track structure for a vehicle seat having a forwardly tiltable back rest, the seat track structure comprising an elongated lower stationary track for securement on the floor of a vehicle compartment, an elongated upper movable track slidably mounted on the stationary track along the longitudinal direction thereof for supporting thereon a seat cushion of the vehicle seat, an elongated lock plate secured to the stationary track and being formed with a plurality of longitudinally spaced locking holes, a crank handle having a shaft portion arranged along the movable track and rotatably supported on the movable track, a detent lever secured to the shaft portion of the crank handle for rotation therewith and arranged to be selectively engaged with the locking holes of the lock plate, and resilient means for biasing the detent lever toward the lock plate, the walk-in mechanism comprising:

a release lever rotatably mounted on the shaft portion of said crank handle and being provided at an upper portion thereof with a first projection and at one side thereof with a second projection to be engaged with said detent lever;

a resilient plate secured at one end thereof on said upper movable track and located above said release lever to be flexible in a vertical direction, said resilient plate being provided at an intermediate portion thereof with a downward projection and being formed at another end portion thereof with an opening to receive the first projection of said release lever therein;

means for biasing said release lever toward a first position in which the first and second projections of said release lever are respectively disengaged from said resilient plate and said detent lever; and linkage means connecting said release lever to the back rest of said vehicle seat in such a manner that when the back rest is tilted forwardly, said release lever is rotated to a second position in which the first and second projections of said release lever are respectively engaged with the opening of said resilient plate and said detent lever and that when the back rest is raised backwardly, said release lever is returned to the first position;

wherein said lock plate is formed with an upwardly protruded rear end portion which is located to brought into engagement with the downward projection of said resilient plate during backward movement of said movable track from a forwardly displaced position.

2. A walk-in mechanism as claimed in claim 1, wherein said upper movable track is formed at one side thereof with a recess which is arranged to receive said detent lever therein.

3. A walk-in mechanism as claimed in claim 1, wherein the downward projection of said resilient plate is in the form of a downwardly extending lug member fixed to an intermediate portion of said resilient plate to be brought into engagement with the upwardly protruded rear end portion of said lock plate.

* * * * *